United States Patent [19]  
Bott

[11] 4,432,478  
[45] Feb. 21, 1984

[54] VEHICLE ARTICLE CARRIER

[76] Inventor: John A. Bott, 931 Lake Shore Dr., Grosse Pointe Shores, Mich. 48236

[21] Appl. No.: 507,507

[22] Filed: Jun. 24, 1983

Related U.S. Application Data

[63] Continuation of Ser. No. 259,898, May 4, 1981.

[51] Int. Cl.³ .............................................. B60R 9/00
[52] U.S. Cl. .................................... 224/321; 224/324; 224/326
[58] Field of Search ............... 224/321, 309, 316, 322, 224/323, 324, 325, 326, 327

[56] References Cited

U.S. PATENT DOCUMENTS

| 3,241,501 | 3/1966 | Watts | 224/321 X |
| 3,519,180 | 7/1970 | Bott | 224/321 |
| 3,677,451 | 7/1972 | Burland | 224/322 |
| 4,015,760 | 4/1977 | Bott | 224/324 |
| 4,106,680 | 8/1978 | Bott | 224/324 |

Primary Examiner—Steven M. Pollard  
Attorney, Agent, or Firm—Harness, Dickey & Pierce

[57] ABSTRACT

A carrier for luggage or the like is mounted on a vehicle body. The carrier consists of separate load supporting slats each of which has an upwardly facing groove running lengthwise thereof. The slats are made from roll formed sheet steel and their grooves provide means for securing adjustable tie-down members or other article securing devices on the slats. Decorative and protective plastic strips are also fitted in the slat grooves.

8 Claims, 7 Drawing Figures

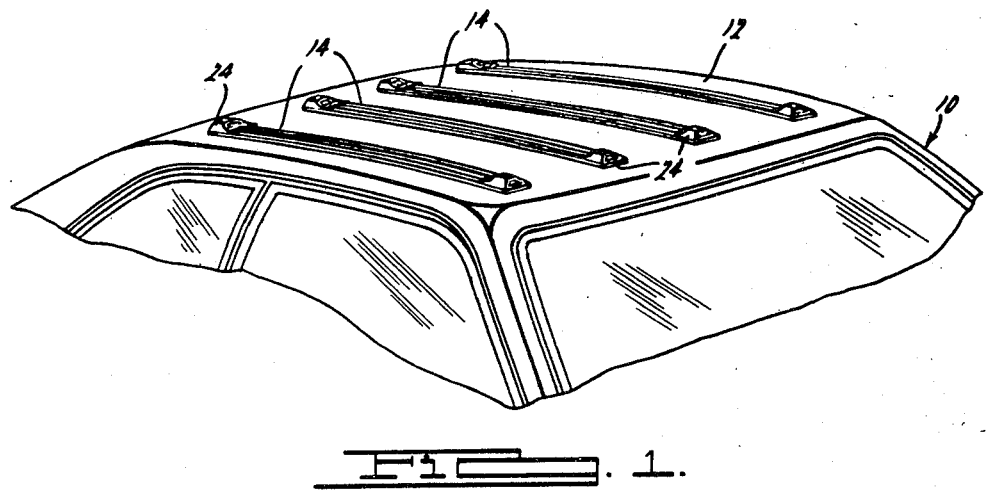
FIG. 1.
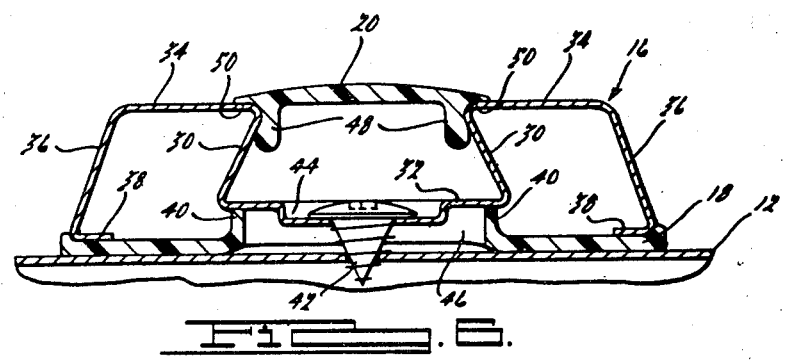
FIG. 6.
FIG. 7.

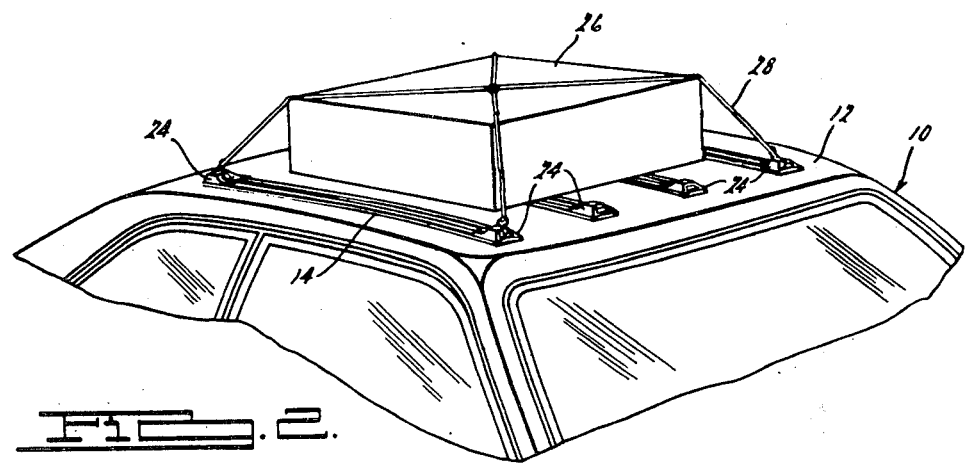
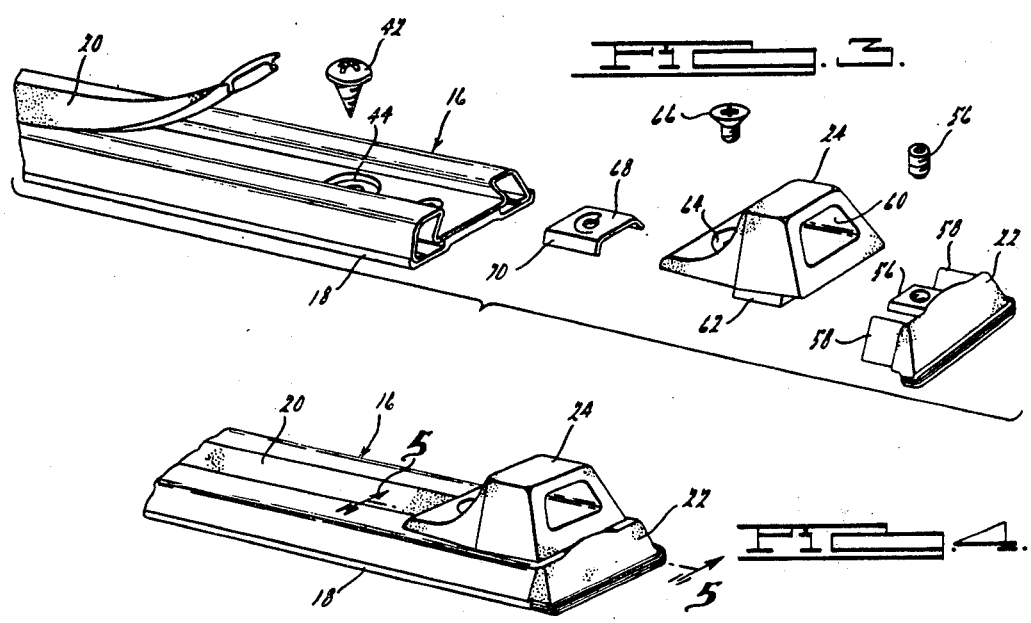
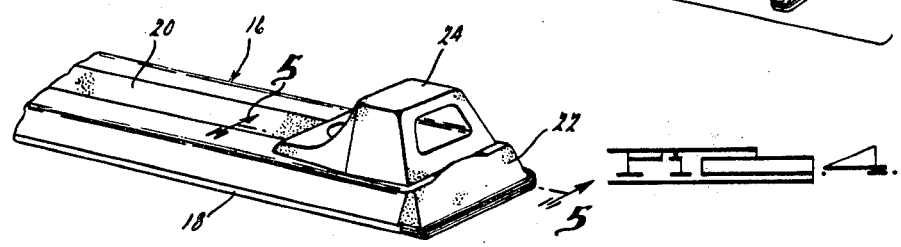
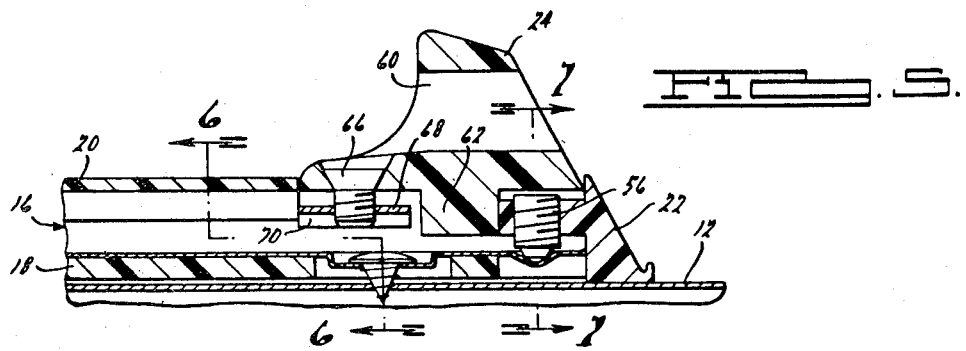

VEHICLE ARTICLE CARRIER

This is a continuation of application Ser. No. 259,898, filed May 4, 1981, which is a continuation of Ser. No. 958,395, filed Nov. 7, 1978, which is a continuation of Ser. No. 779,522, filed Mar. 21, 1977, now abandoned, which was a voluntary divisional application of Ser. No. 604,644, filed Aug. 14, 1975, now U.S. Pat. No. 4,015,760; U.S. Ser. No. 779,522, filed Mar. 21, 1977 also a continuation-in-part of Ser. No. 743,602, filed Nov. 22, 1976, now U.S. Pat. No. 4,009,658, which is a continuation of Ser. No. 486,415, filed July 8, 1974, now abandoned.

BACKGROUND OF THE INVENTION

The luggage carrier illustrated in this application dicloses an improvement over the construction shown in my U.S. Pat. No. 4,099,658. The carrier is attractive in appearance, relatively inexpensive to manufacture, strong and durable in construction, versatile in use and minimizes undesirable wind resistance. The carrier illustrated herein differs from the carrier of my above mentioned prior application principally in the construction of the metal slat.

SUMMARY OF THE INVENTION

The luggage rack of the present invention utilizes slats made from roll formed strips of sheet metal. Each slat has a pair of upwardly converging inner walls defining a groove therebetween which runs the length of the slat. The groove receives and holds a fastener or the like for securing an adjustable tie-down member or other article securing device on the slat. The slat also has outer walls spaced on the opposite sides of the inner walls with supporting ledges connecting the upper ends of the inner and outer walls on opposite sides of the groove. An article to be transported can rest directly on the supporting ledges or on a decorative and protective plastic strip which is desirably mounted on the ledges and is held in place by resilient ribs formed on its underside and fitted in the slat groove. The inner and outer walls cooperate to carry the weight of an article resting on the slat.

DESCRIPTION OF THE FIGURES OF THE DRAWING

FIG. 1 is a perspective view of an article carrier of the present invention shown mounted on the roof of a fragmentarily illustrated passenger car;

FIG. 2 is a view similar to FIG. 1 showing an article to be transported secured on the article carrier;

FIG. 3 is an exploded perspective view of a portion of one of the slats which make up the luggage carrier of FIGS. 1 and 2;

FIG. 4 is an assembled perspective view of the structure illustrated in FIG. 3;

FIG. 5 is an enlarged sectional view of the structure illustrated in FIG. 4 taken along the line 5—5 thereof; and FIGS. 6 and 7 are sectional views of the structure shown in FIG. 5 taken along the lines 6—6 and 7—7 thereof, respectively.

DETAILED DESCRIPTION OF THE ILLUSTRATED EMBODIMENT OF THE INVENTION

FIG. 1 shows an automobile 10 having a roof 12 which is disposed in a generally horizontal plane. Mounted on the roof 12 are a plurality of slat assemblies 14 which are arranged in spaced parallel relation, extending longitudinally of the automobile 10. The slat assemblies 14, while they are separate from one another and connected only through the automobile roof, cooperate to comprise the luggage carrier of the present invention.

Each slat assembly 14 includes a slat 16 made from a roll formed strip of stainless steel sheet material. The slat 16 rests on an extruded relatively soft plastic mounting pad 18. A decorative and protective extruded plastic strip 20 of somewhat more rigid material than the pad 18 is positioned on the upper surface of each slat 16. The other principal parts of each slat assembly 14 comprise a pair of end caps 22, located one at each end of the slat 16 and a pair of eyed tie-down members 24.

While a variety of different articles may be transported on the luggage carrier of the present invention, a typical use of the carrier is illustrated in FIG. 2 in which a box 26 is shown resting on the slat assemblies 14 and is secured in place by rope 28 tied to various of the tie-down members 24.

The cross sectional shape of each slat 16 is best shown in FIG. 6. The slat 16 will be seen to have a pair of upwardly converging inner walls 30 which are joined at their lower ends by means of a connecting web portion 32. The walls 30 and web portion 32 together define an upwardly open groove extending longitudinally along the middle of the slat 16. Extending horizontally outwardly from the upper ends of the inner walls 30 are a pair of supporting walls or surfaces 34 which are connected on their outer sides to a pair of upstanding outer walls 36 of the slat. The lower ends of the outer walls 36 have their margins inturned to form supporting ledges 38. It will be seen that the web portion 32 of the slat 16 is disposed in a plane located above the level of the ledges 38. However, the mounting pad 18 has a raised center portion 40 which engages the bottom of the web portion 32. Accordingly, both the ledges 38 and the web portion 32 are fully supported by the mounting pad 18 for the transference of a load through both the walls 30 and 36 to the roof 12.

The slats 16 and their mounting pads 18 are held in place on the car roof 12 by means of screws 42. As will be seen in FIG. 6, the head of each screw 42 is recessed within a pocket 44 provided for that purpose in the web portion 32. The mounting pad 18 is provided with a suitable opening 46 for the reception of the pocket 44 and screw 42. The plastic protective and decorative strips 20 are mounted on the slats 16 by the provision of spaced depending ribs 48 formed on the undersides of the strips. The ribs 48 project into the groove defined between the walls 30 and are suitably shaped to have an interference fit with the walls 30. The shape and spacing of the ribs 48 are such that the ribs may be inserted into the slat groove simply by pressing downwardly on the strip 20 so that the ribs 48 will snap past the upper edges of the walls 30. It will be seen that the strips 20 have shoulders 50 which project outwardly of the ribs 48 and rest on the supporting surfaces or walls 34. By this means the weight of an object resting on the strip 20 is transferred to the supporting walls 34 and through the walls 30, 36 to the mounting pad 18 and automobile roof 12.

The slat assemblies 14 are finished at their ends by means of the molded plastic end caps 22 of identical construction. Each end cap 22 has a central tongue 52 projecting into the groove between the walls 30 and a pair of outer tongues 54 projecting into the spaces between the inner and outer walls 30 and 36 on each side of the groove. The outer tongues 54 engage the inner surfaces of the slat outer walls 36 and supporting walls 34 to prevent tilting and/or upward movement of the end cap 22 relative to the slat 16. A setscrew 56 is threaded through the center tongue 52 and engages a depression 58 formed in the web portion 32 to prevent the end cap 22 from being pulled out of the end of the slat 16.

The slats 16 are designed to support article securing members on the surfaces 34. Such an article securing member is illustrated in the form of the eyed tie-down member 24 which has an eyelet 60, a depending key 62 conformably fitted in the groove between the walls 30 and a screw receiving opening 64. A screw 66 is seated in the opening 64 and projects into the groove between the walls 30 for threaded engagement with a stamped sheet metal nut 68. The nut 68 has sidewalls 70 which engage the inner surfaces of the inner walls 30 to resist upward movement of the nut 68 out of the groove between the walls 30. The screw 66 is threaded into the nut 68 and is tightened to clamp the tie-down member 24 firmly in place on the supporting surfaces 34. When the screw 66 is loosened and the plastic strip 20 removed, the tie-down members 24 can be slid along the length of the slat 16 and tightened in any desired position.

It should be noted that the decorative and protective plastic strips 20 serve several functions. Firstly, they cover the screws 42 and close the groove between the walls 30 to improve the overall appearance of the slat assemblies 14. If desired, the strips 20 can be color coordinated with other parts of the car such as a vinyl roof covering. In addition the plastic strips 20 protect luggage from possibly being scratched.

I claim:

1. In combination with an automotive vehicle having a generally horizontal exterior body surface with a leading edge and a trailing edge of said surface, an article carrier comprising:

a pair of generally horizontally arranged article supporting slats each having a uniform cross-sectional shape, a generally horizontal transverse width greater than the vertical height and both adapted to be directly and fixedly mounted upon the same said horizontal surface of said vehicle presenting a low profile thereon and having a decorative appearance, each said slat having an upwardly opening slot extending longitudinally thereof, said slot being defined in part by a bottom wall and upwardly directed side walls and each said slat having a pair of horizontal supporting surfaces adjacent opposite sides of said slot and capable of having articles supported thereon, said supporting surfaces being cooperable between said slats to be capable of supporting articles on said slats, said surfaces being disposed in the same plane which plane is spaced from the horizontal surface of said vehicle;

article securing means associated with each of said slats, a substantial portion of said article securing means extending upwardly from said horizontal supporting surfaces, a portion of said article securing means disposed within said slot, said article securing means having an operative securing position and having a fastening element extending along an axis arranged generally perpendicular to said supporting surfaces and said vehicle exterior surface;

fastening means disposed at least in part within said slot and including portions adapted to engage the interior of said slot for releasably attaching said article securing means in its operative securing position at a preselected longitudinal position along said slat, said fastening means being operatively connected to said slat such that said fastening means may be threadably advanced in one direction along said axis toward a first position in which said portions of said fastening means engage the interior of said slot in such manner as to clamp said article securing means in said preselected position, and such that said fastening means may be threadedly advanced in the opposite direction along said axis toward a second position in which said article securing means disengages the interior of said slot in such a manner as to unclamp said article securing means and permit the same to be moved longitudinally along said slat; and end cap means disposed at at least one end of each of said slats closing off said slot to stop the travel of said article securing means in at least one direction at said at least one end of said slat when said fastening means is disposed in said second position in which said article securing means disengages the interior of said slot, said end cap means extending forwardly from each said slat toward the leading edge of said body surface in an aerodynamic and aesthetically appealing manner, each end cap means including a profile extending from a substantially flush profile with the configuration of said slat at the interface between each of said end cap means and each of said slats downwardly to interface with said horizontal body surface.

2. The combination of claim 1 wherein said fastening means includes a top wall having depending diverging side walls on opposite sides thereof.

3. The combination as set forth in claim 2 wherein said side walls converge toward the upper portion of said slat.

4. The combination of claim 1 wherein said fastening means has a threaded opening therein and said fastening element has said threaded surface thereof engaged with said threaded opening.

5. The combination as set forth in claim 1 wherein said article securing means comprise a tie-down element adapted to have a rope-like member secured thereto.

6. The combination as set forth in claim 1 which includes threaded means for causing said fastening means to engage the interior of said slot.

7. The combination as set forth in claim 1 which includes an upper trim strip covering said slot and having downwardly extending portions snap-fitted with the upper end thereof.

8. The combination as set forth in claim 1 wherein said slat is fabricated of a roll-formed sheet metal.

* * * * *

UNITED STATES PATENT AND TRADEMARK OFFICE
CERTIFICATE OF CORRECTION

PATENT NO. : 4,432,478

DATED : 2-21-84

INVENTOR(S) : John A. Bott

It is certified that error appears in the above-identified patent and that said Letters Patent is hereby corrected as shown below:

Column 1, line 13, "4,009,658" should be --4,099,658--.

Column 1, line 19, "dicloses" should be --discloses--.

Signed and Sealed this

Fifteenth Day of May 1984

[SEAL]

Attest:

GERALD J. MOSSINGHOFF

Attesting Officer

Commissioner of Patents and Trademarks